US012806803B2

(12) United States Patent
Yeum

(10) Patent No.: US 12,806,803 B2
(45) Date of Patent: Nov. 24, 2026

(54) GRIPPER APPARATUS FOR VEHICLE ASSEMBLY

(71) Applicants: Hyundai Motor Company, Seoul (KR); Kia Corporation, Seoul (KR)

(72) Inventor: Jung Whan Yeum, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 319 days.

(21) Appl. No.: 18/615,580

(22) Filed: Mar. 25, 2024

(65) Prior Publication Data

US 2025/0135658 A1 May 1, 2025

(30) Foreign Application Priority Data

Oct. 26, 2023 (KR) ........................ 10-2023-0144398

(51) Int. Cl.

*B62D 35/00* (2006.01)
*B25J 11/00* (2006.01)
*B25J 15/06* (2006.01)

(52) U.S. Cl.

CPC ......... *B25J 15/0616* (2013.01); *B25J 11/008* (2013.01); *B62D 35/007* (2013.01)

(58) Field of Classification Search

None

See application file for complete search history.

(56) References Cited

U.S. PATENT DOCUMENTS

| | | | | |
|---|---|---|---|---|
| 10,005,188 | B2 * | 6/2018 | Akama ................ | B25J 15/0616 |
| 11,213,957 | B2 * | 1/2022 | Lin ...................... | B25J 15/0616 |
| 11,878,824 | B2 | 1/2024 | Saitou et al. | |

FOREIGN PATENT DOCUMENTS

| | | | |
|---|---|---|---|
| JP | H 5-56765 | U | 7/1993 |
| JP | 2023-023212 | A | 2/2023 |
| KR | 20-1998-0015160 | U | 6/1998 |
| KR | 10-0504216 | B1 | 7/2005 |
| KR | 10-1363078 | B1 | 2/2014 |
| KR | 10-2018-0113114 | A | 10/2018 |
| KR | 10-2354800 | B1 | 1/2022 |

OTHER PUBLICATIONS

Ito JP2018-6309A, "Wire Harness Manufacturing Method and Wire Terminal Processing Device" all pages (Year: 2018).*

* cited by examiner

*Primary Examiner* — Michael S Lowe

(74) *Attorney, Agent, or Firm* — Fox Rothschild LLP

(57) ABSTRACT

A gripper apparatus for vehicle assembly includes: a main body; a gripper mounted on the main body, and configured to grip a component to be loaded; and a cable organizer connected to the main body, and configured to organize a cable extending from the component to be loaded. The cable organizer may include: a cable clamp for clamping or unclamping the cable; and a first linear actuator mounted on the main body, and configured to move the cable clamp upward and downward.

20 Claims, 16 Drawing Sheets

GRIPPER APPARATUS FOR VEHICLE ASSEMBLY

CROSS-REFERENCE TO RELATED APPLICATION

This application claims under 35 U.S.C. § 119(a) the benefit of Korean Patent Application No. 10-2023-0144398, filed on Oct. 26, 2023 in the Korean Intellectual Property Office, the entire contents of which are incorporated by reference herein.

BACKGROUND

(a) Technical Field

The present disclosure relates to a gripper apparatus for use in a vehicle assembly process, more particularly, to the gripper apparatus configured to automatically organize a cable when loading a component having the cable onto another component.

(b) Description of the Related Art

A vehicle may include various components/parts, and during vehicle assembly, the components/parts may be loaded and transported by a robot and a gripper apparatus.

For example, a rear spoiler may be loaded onto a tailgate of the vehicle by the robot and the gripper apparatus, and the rear spoiler and the tailgate may be preassembled. In one example of the rear spoiler, referring to FIG. 1, a rear spoiler 2 may have a lamp 3 embedded therein, and a cable 5 extending from the lamp 3. An operator may connect a connector 6 of the cable 5 extending from the lamp 3 of the rear spoiler 2 to an opposite connector provided on a vehicle body, and the operator may assemble the rear spoiler 2 and a tailgate 1 using fasteners. When the rear spoiler 2 and the tailgate 1 are preassembled, the cable 5 extending from the lamp 3 of the rear spoiler 2 may be in an unorganized state so that it may be difficult for the cable 5 to pass through a hole 7 of the tailgate 1. To deal with this, in an existing assembly process, the operator may tie a twisted portion of the cable 5 with a band, thereby allowing the cable 5 to easily pass through the hole 7 of the tailgate.

When a component having a cable is loaded onto another component of the vehicle to assemble them, the operator needs to first tie the unorganized cable with the band, making the assembly process very cumbersome and making assembly time excessively long.

The above information described in this background section is provided to assist in understanding the background of the inventive concept, and may include any technical concept which is not considered as the prior art that is already known to those skilled in the art.

SUMMARY

An aspect of the present disclosure provides a gripper apparatus configured to automatically organize a cable when gripping and loading a component having the cable onto another component.

According to an aspect of the present disclosure, a gripper apparatus may include: a main body; a gripper mounted on the main body, and configured to grip a component to be loaded; and a cable organizer connected to the main body, and configured to organize a cable extending from the component.

The cable organizer may include: a cable clamp clamping or unclamping the cable; and a first linear actuator mounted on the main body, and moving the cable clamp upward and downward.

The cable organizer may further include a first moving member which is movable upward and downward by the first linear actuator, and the cable clamp may be mounted on the first moving member.

The cable clamp may include a first clamp member, a second clamp member facing the first clamp member, and a second linear actuator moving the first clamp member and the second clamp member in opposite directions.

Each of the first clamp member and the second clamp member may have a clamp surface pressing the cable, and the clamp surface may have a concave shape.

A height of the first clamp member may be different from a height of the second clamp member.

The second linear actuator may be fixed to the first moving member.

The cable clamp may further include a second moving member and a third moving member which are configured to move in opposite directions by the second linear actuator. The first clamp member may be connected to the second moving member, and the second clamp member may be connected to the third moving member.

The cable clamp may further include a first rotary actuator rotating the first clamp member, and a second rotary actuator rotating the second clamp member.

The first rotary actuator may be mounted on the second moving member, and the second rotary actuator may be mounted on the third moving member.

The first clamp member may have a first leg rotatably connected to the first rotary actuator, and the second clamp member may have a second leg rotatably connected to the second rotary actuator.

The cable clamp may further include a connector push pin extending from at least one of the first clamp member and the second clamp member, and pushing a connector provided on an end of the cable.

The gripper may be mounted on an end of a rod extending from the main body.

The gripper may be rotated by a gripper rotary actuator, and the gripper rotary actuator may be mounted on the main body.

The gripper rotary actuator may include a rotation bracket rotatably mounted on an end thereof, and the gripper may be mounted on an end of a rod extending from the rotation bracket.

A vehicle may include a component assembled by the gripper apparatus.

According to another aspect of the disclosure, a gripper apparatus for assembling a component of a vehicle may include: a main body; a gripper mounted on the main body, and configured to grip the component to be loaded; and a cable organizer connected to the main body, and configured to organize a cable extending from the component, where the cable organized further includes: a cable clamp for clamping or unclamping the cable; and a first linear actuator mounted on the main body, the first linear actuator configured to move the cable clamp upward and downward.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
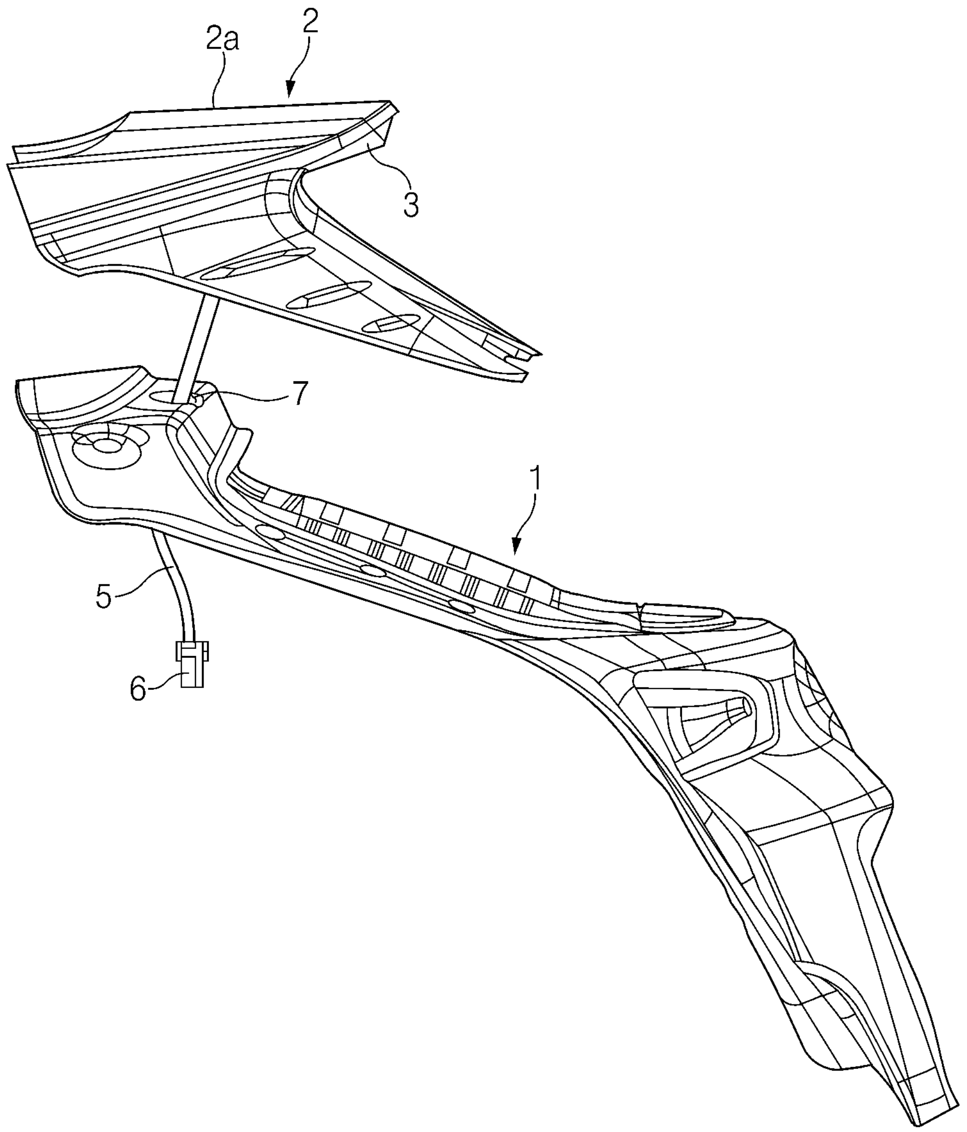
FIG. 1 illustrates a state in which a rear spoiler is loaded onto a tailgate.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-of", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 4:
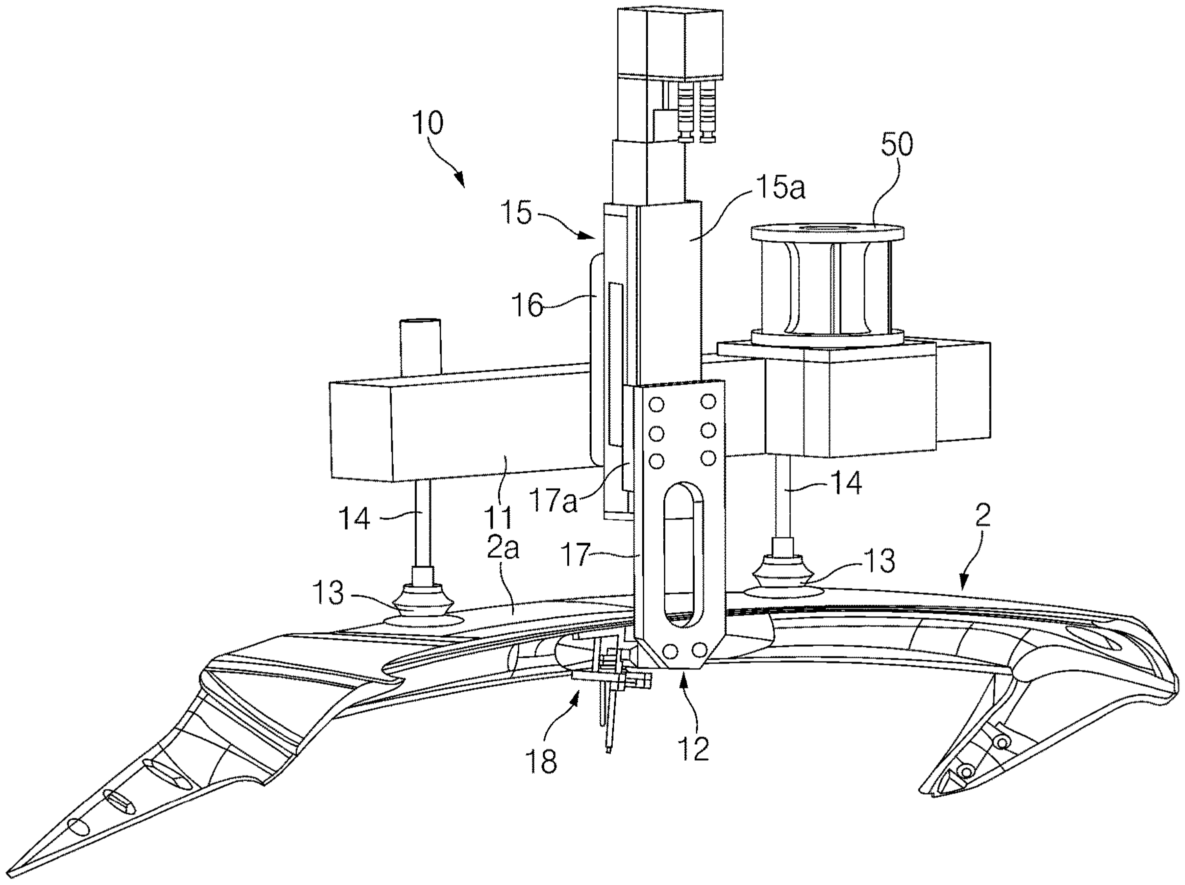
FIG. 4 illustrates a perspective view of a state in which a gripper apparatus according to an exemplary embodiment of the present disclosure grips a rear spoiler.

Referring to FIG. 4, a gripper apparatus 10 for use in vehicle assembly according to an exemplary embodiment of the present disclosure may include a main body 11, a gripper 13 mounted on the main body 11, and a cable organizer 12 connected to the main body 11.

As provided herein, the cable organizer 12 refers to a mechanical device that is configured to organize a cable (e.g., the cable 5) by removing any twisted portions (e.g., a twisted portion 5*a*). The cable organizer 12 may organize the cable 5 so as to be arranged in a substantially straight orientation (i.e., straightly) so that any twisted portion(s) of the cable 5 are substantially removed.

Figure 6:
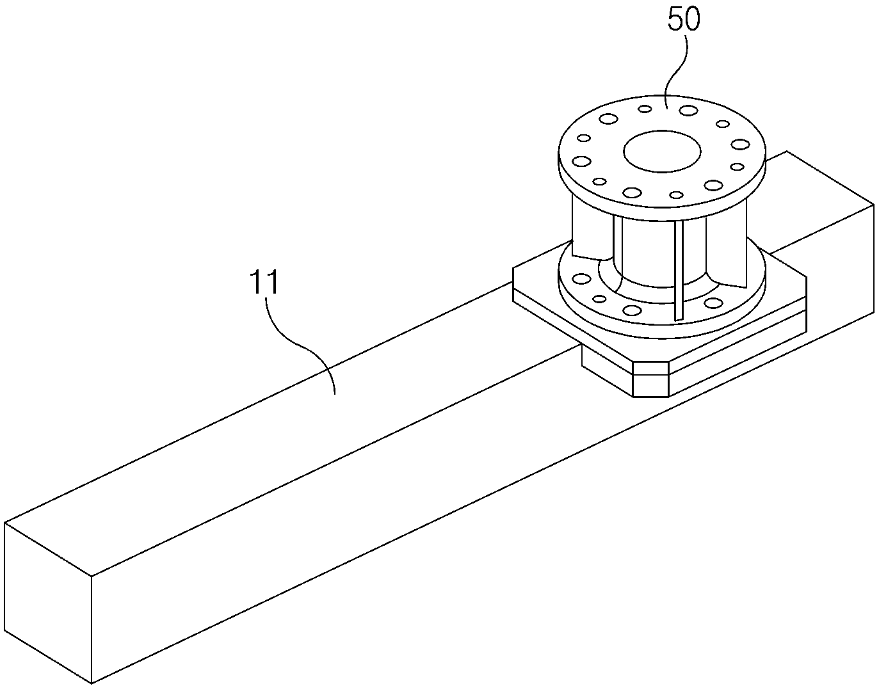
FIG. 6 illustrates a perspective view of a main body of a gripper apparatus according to an exemplary embodiment of the present disclosure.

The main body 11 may extend along a width direction of a rear spoiler 2 which is a component (target object) to be loaded. Referring to FIG. 6, the main body 11 may include a mount 50 fixed to one side thereof, and the mount 50 may be mounted on a robot (not shown) so that the main body 11 may be connected to the robot, and the main body 11 may be moved by the robot.

The gripper 13 may be configured to grip a component to be loaded such as the rear spoiler 2.

According to an exemplary embodiment, the gripper 13 may be a vacuum cup connected to a vacuum source (not shown), and the gripper 13 may be configured to adsorb a component such as the rear spoiler 2.

According to an exemplary embodiment, as illustrated in FIG. 4, the pair of grippers 13 may be symmetrically mounted on the main body 11, and the pair of grippers 13 may adsorb a top surface 2*a* of the rear spoiler 2. Each gripper 13 may be connected to the main body 11 through a rod 14. A top end of the rod 14 may be fixed to the main body 11 so that the rod 14 may extend downwardly from the main body 11, and the gripper 13 may be mounted on a bottom end of the rod 14. The gripper 13 may be mounted on the bottom end of the rod 14 so that the gripper 13 may be spaced apart from the main body 11.

Figure 5:
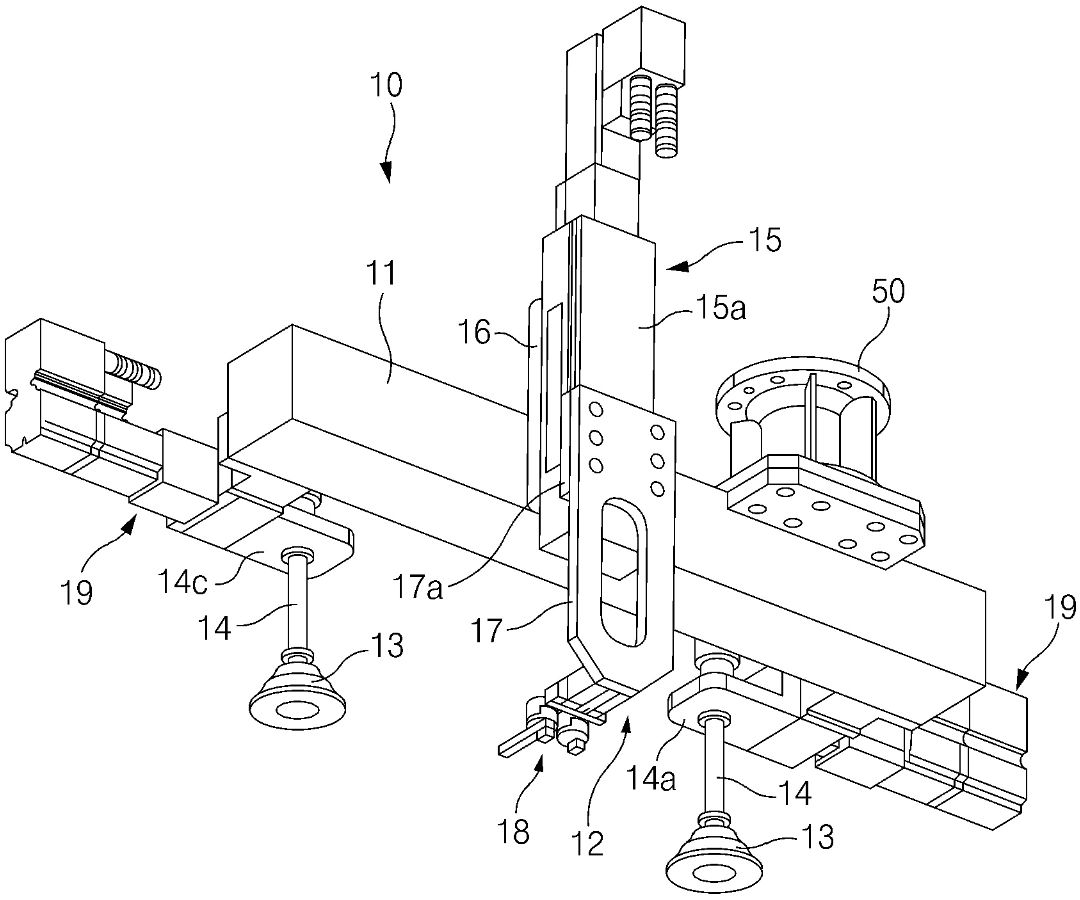
FIG. 5 illustrates a perspective view of a gripper apparatus according to an exemplary embodiment of the present disclosure.
Figure 7:
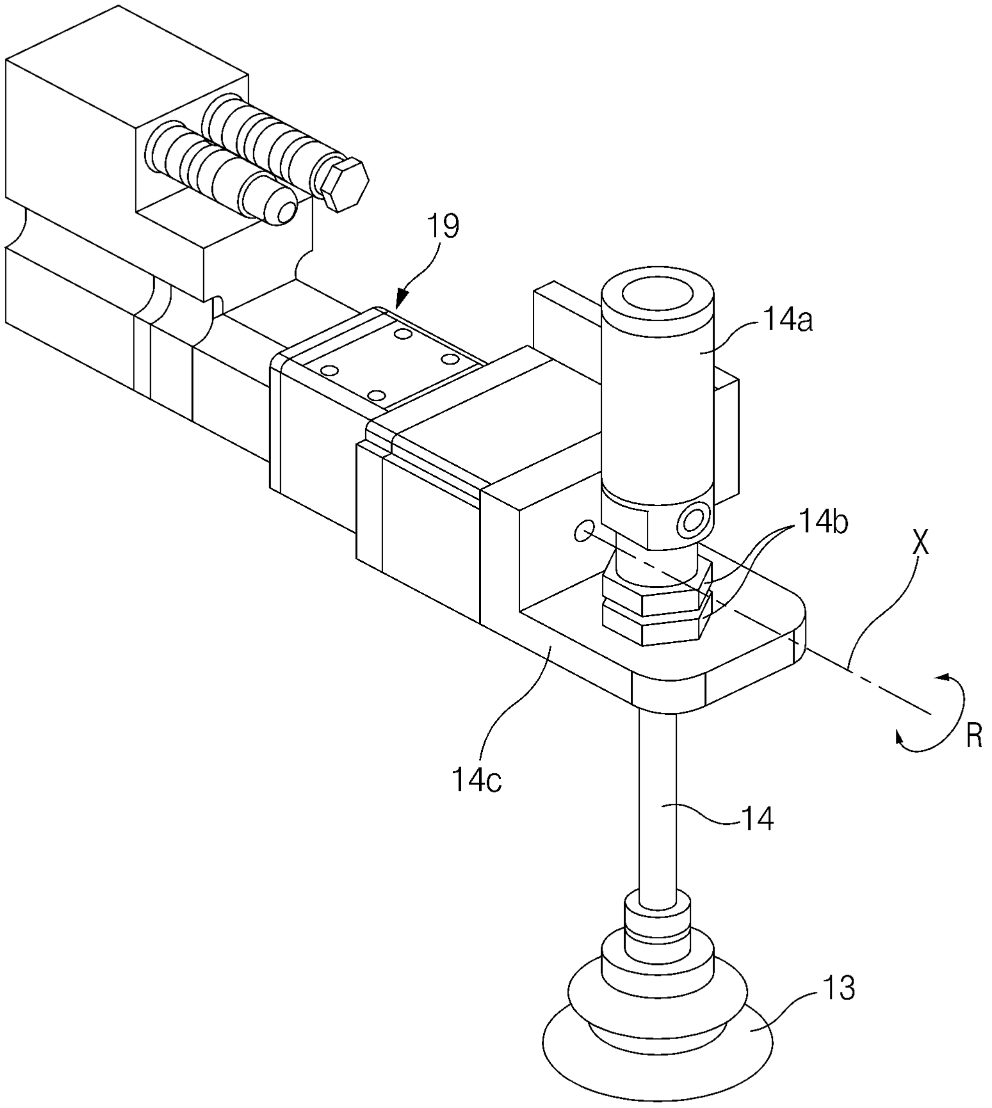
FIG. 7 illustrates a perspective view of a state in which a gripper is connected to a gripper rotary actuator in a gripper apparatus according to an exemplary embodiment of the present disclosure.
Figure 8:
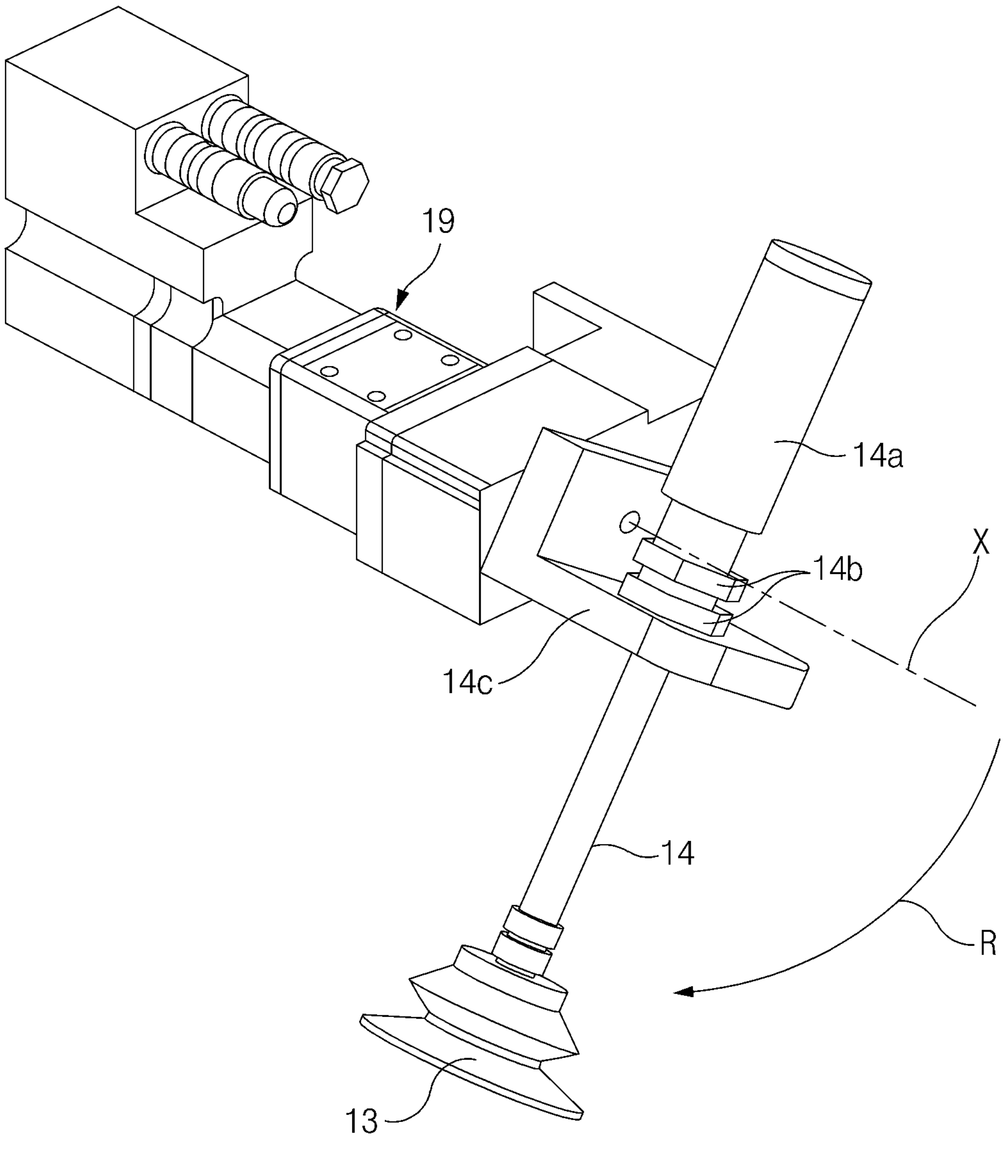
FIG. 8 illustrates a perspective view of a state in which a gripper is rotated by a gripper rotary actuator in a gripper apparatus according to an exemplary embodiment of the present disclosure.

According to another exemplary embodiment, as illustrated in FIG. 5, the pair of grippers 13 may be configured to rotate independently by a pair of gripper rotary actuators 19, and each gripper rotary actuator 19 may be mounted on the main body 11. Referring to FIGS. 7 and 8, each gripper 13 may rotate around a rotation axis X of the gripper rotary actuator 19 in a predetermined direction. The gripper rotary actuator 19 may include a rotary motor, a rotary cylinder, etc. A rotation bracket 14*c* may be rotatably mounted on an end of the gripper rotary actuator 19, the gripper 13 may be mounted on the bottom end of the rod 14, the rod 14 may have a head portion 14*a* provided on the top end thereof, the head portion 14*a* may be fixed to the rotation bracket 14*c* through nuts 14*b*, and the rod 14 may extend downwardly from the rotation bracket 14*c*. The rotation bracket 14*c* may rotate around the rotation axis X of the gripper rotary actuator 19, and accordingly the gripper 13 connected to the rotation bracket 14*c* may rotate around the rotation axis X of the gripper rotary actuator 19 (see direction R in FIGS. 7 and 8). The top surface 2*a* of the rear spoiler 2 may be inclined at a predetermined angle, and the gripper 13 may be rotated to correspond to the inclined top surface 2*a* of the rear spoiler 2 by the gripper rotary actuator 19, and accordingly the gripper 13 may tightly adsorb the inclined top surface 2*a* of the rear spoiler 2.

Figure 2:
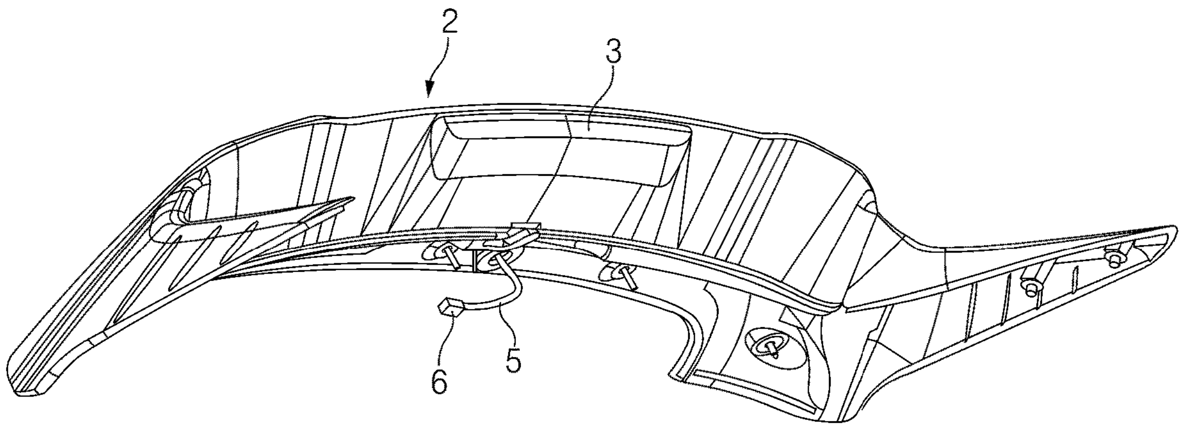
FIG. 2 illustrates a bottom perspective view of a rear spoiler.
Figure 3:
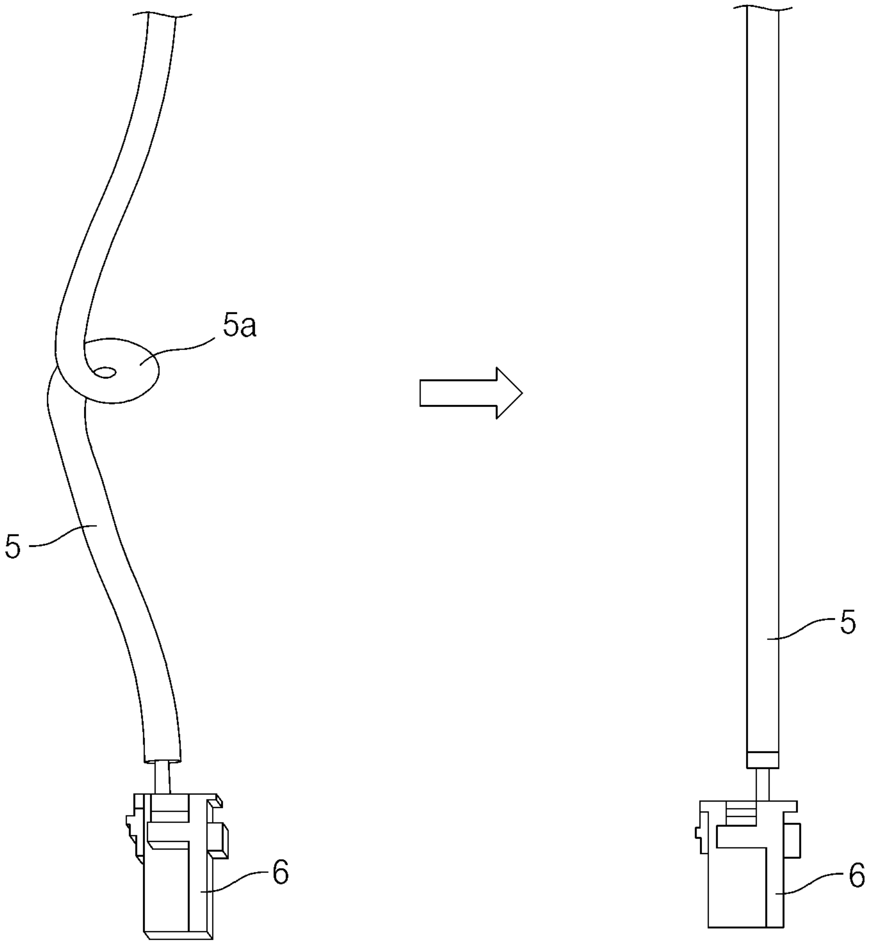
FIG. 3 illustrates a process of organizing a twisted portion of a cable extending from a rear spoiler.

Referring to FIGS. 1 and 2, the rear spoiler 2 may have a lamp 3 embedded therein, the rear spoiler 2 may have a cable 5 extending from the lamp 3, and the cable 5 may have a connector 6 provided on an end thereof. The cable organizer 12 may be configured to organize the cable 5 extending from the lamp 3 embedded in the rear spoiler 2. Referring to FIG. 3, when the cable 5 is unorganized, a portion of the cable 5 may be twisted to thereby form a twisted portion 5*a*. The cable organizer 12 may organize the cable 5 straightly (e.g., in a substantially straight orientation) so that the twisted portion 5*a* of the cable 5 may be removed.

The cable organizer 12 may include a cable clamp 18 clamping or unclamping the cable 5, and a first linear actuator 15 moving the cable clamp 18 upward and downward.

The cable clamp 18 may be configured to move upward and downward with respect to the main body 11 by the first linear actuator 15. Referring to FIGS. 4 and 5, the first linear actuator 15 may be mounted on a middle portion of the main body 11 through a mounting bracket 16, and the first linear actuator 15 may extend vertically from the main body 11. A first moving member 17 may be mounted to move upward and downward by the first linear actuator 15. The first linear actuator 15 may have a guide portion 15*a*, and the first moving member 17 may have a pair of guide portions 17*a* guided along both edges of the guide portion 15*a*. The first moving member 17 may be moved upward and downward by the first linear actuator 15, and the guide portions 17*a* of the first moving member 17 may be guided along the edges of the guide portion 15*a* of the first linear actuator 15.

Figure 9:
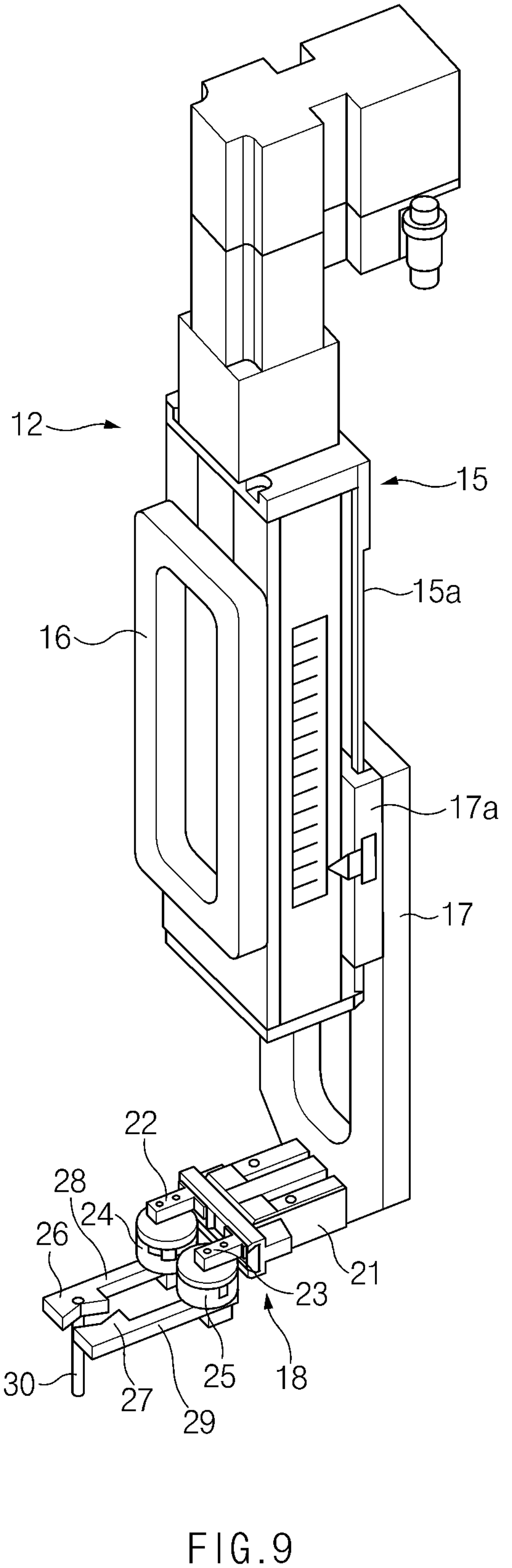
FIG. 9 illustrates a perspective view of a state in which a cable organizer is connected to a first linear actuator in a gripper apparatus according to an exemplary embodiment of the present disclosure.

Referring to FIG. 9, the cable clamp 18 may be mounted on a bottom end of the first moving member 17. The cable clamp 18 may include a first clamp member 26, a second clamp member 27 facing the first clamp member 26, and a second linear actuator 21 moving the first clamp member 26 and the second clamp member 27 in opposite directions.

Figure 10:
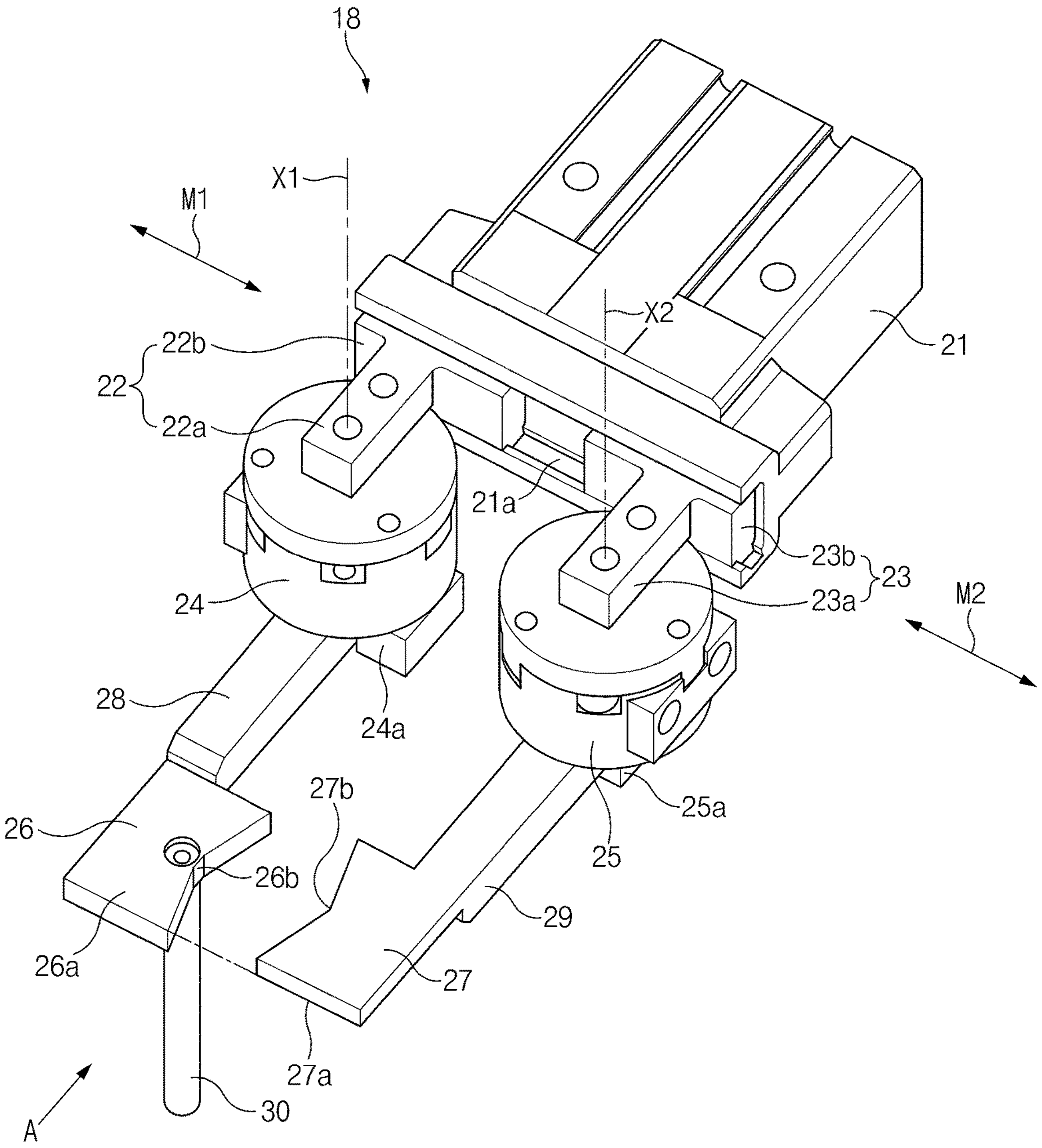
FIG. 10 illustrates a perspective view of a cable organizer of a gripper apparatus according to an exemplary embodiment of the present disclosure.

Referring to FIG. 10, the first clamp member 26 and the second clamp member 27 may be disposed to face each other, and the first clamp member 26 and the second clamp member 27 may move close to or away from each other linearly by the second linear actuator 21. The first clamp member 26 may have a first clamp surface 26*b* pressing the cable 5. The first clamp surface 26*b* may have a concave shape such as a V-like or U-like shape. The second clamp member 27 may have a second clamp surface 27*b* pressing the cable 5, and the second clamp surface 27*b* may have a concave shape such as a V-like or U-like shape. The second clamp surface 27*b* may face the first clamp surface 26*b*. The first clamp member 26 may have a first leg 28 extending from an end thereof toward a second moving member 22, and the second clamp member 27 may have a second leg 29 extending from an end thereof toward a third moving member 23.

Figure 11:
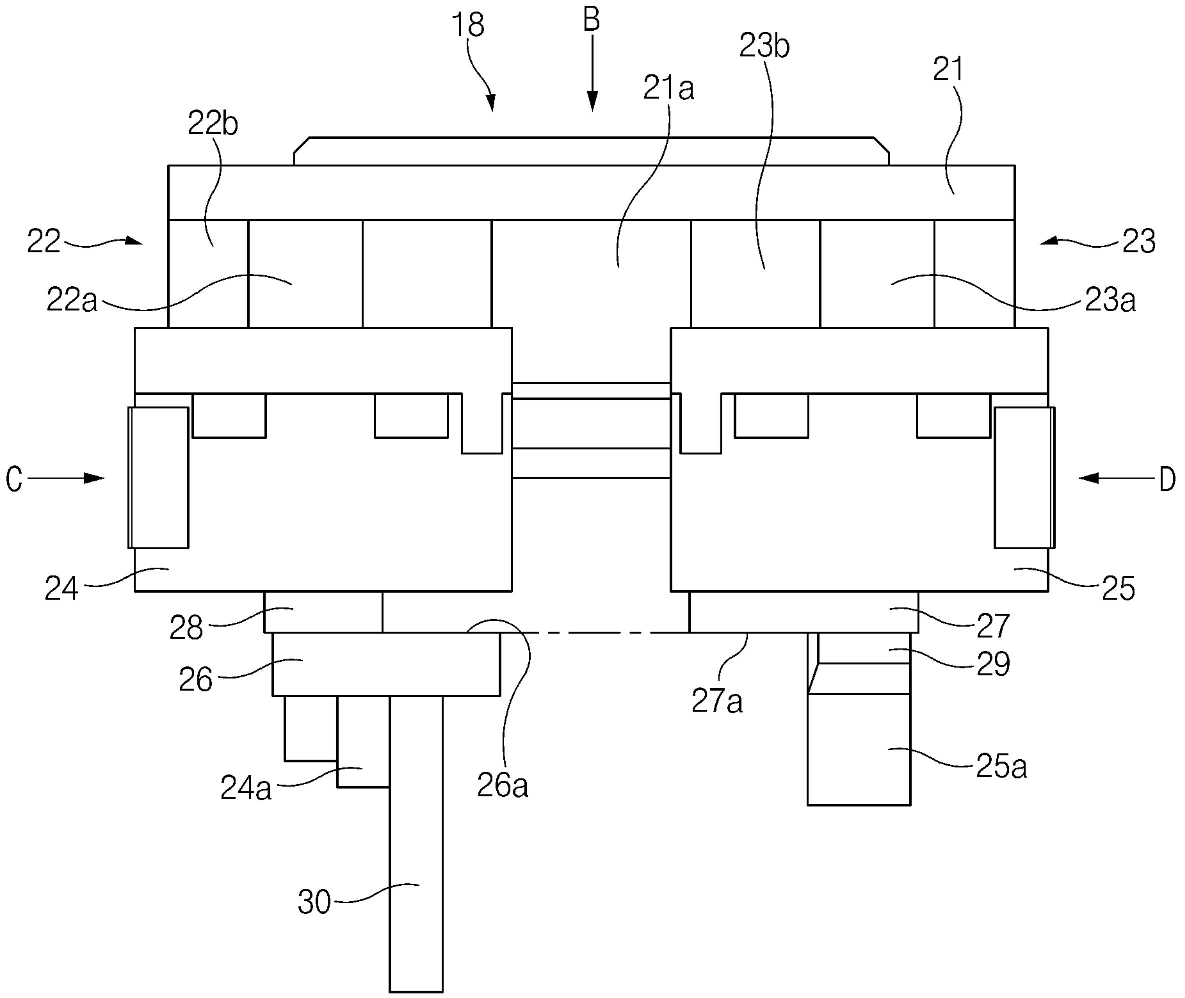
FIG. 11 illustrates a front view, viewed in a direction indicated by arrow A of FIG. 10.
Figure 12:
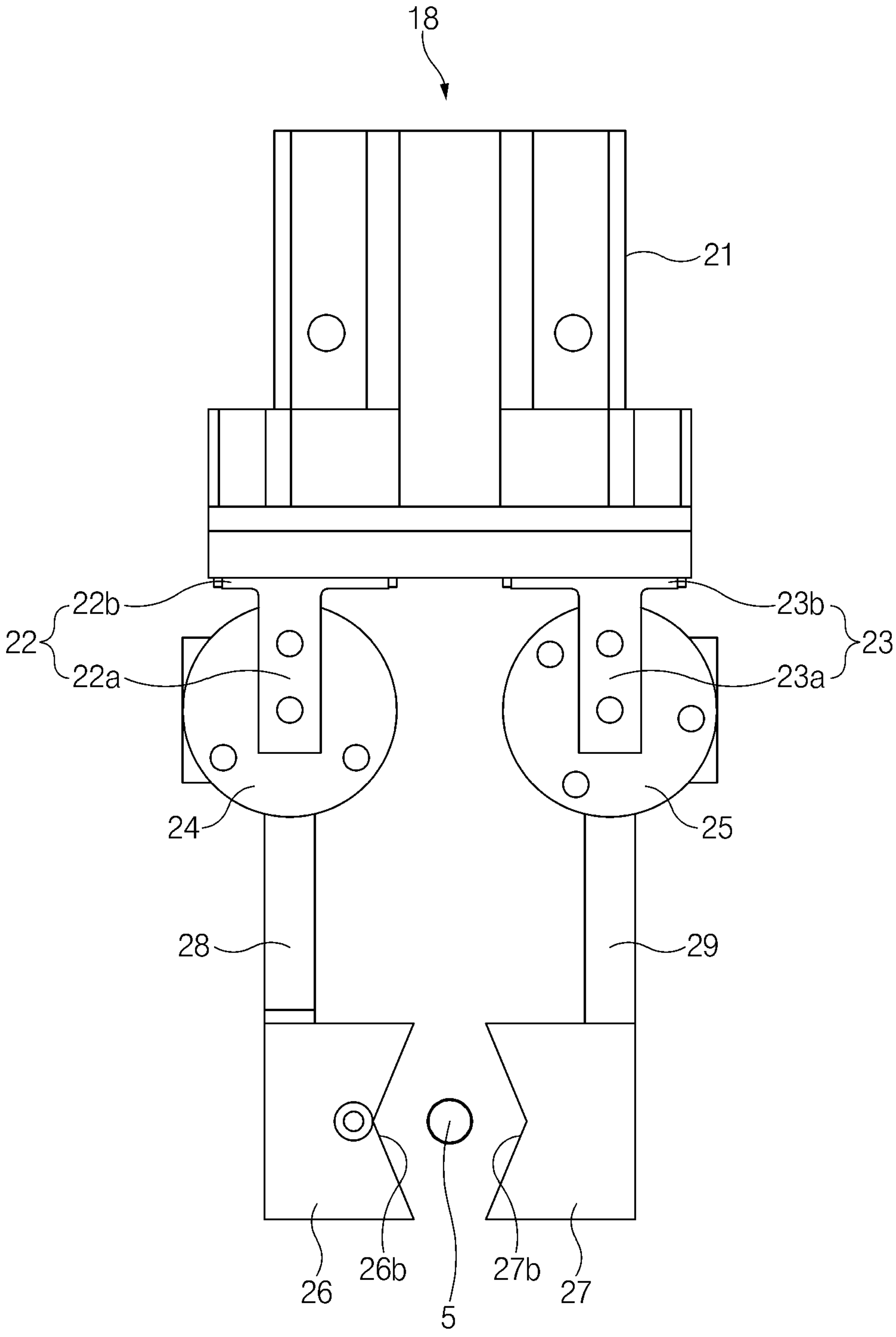
FIG. 12 illustrates a plan view, viewed in a direction indicated by arrow B of FIG. 11.

At least one of the first clamp member 26 and the second clamp member 27 may have a connector push pin 30 extending downwardly. Referring to FIGS. 10 and 11, the connector push pin 30 may extend downwardly from the first clamp member 26. The connector push pin 30 may be configured to push a top surface of the connector 6 provided on the end of the cable 5. The connector push pin 30 may push the top surface of the connector 6 of the cable 5 so that the cable 5 may be tensioned straightly along a longitudinal direction of the connector push pin 30.

Referring to FIG. 10, the cable clamp 18 may include the second moving member 22 and the third moving member 23 moving in opposite directions M1 and M2 by the second linear actuator 21.

Referring to FIG. 9, the second linear actuator 21 may be fixed to the bottom end of the first moving member 17, and the second linear actuator 21 may extend horizontally from the first moving member 17. Referring to FIG. 10, the second linear actuator 21 may move the second moving member 22 in a first horizontal direction M1 and move the third moving member 23 in a second horizontal direction M2. The second linear actuator 21 may have a guide groove 21*a* guiding the movement of the second moving member 22 and the movement of the third moving member 23, and the guide groove 21*a* may be perpendicular to a longitudinal axis of the second linear actuator 21.

Referring to FIG. 10, the first clamp member 26 may be connected to the second moving member 22, and the second clamp member 27 may be connected to the third moving member 23. Accordingly, the first clamp member 26 may move with the second moving member 22, and the second clamp member 27 may move with the third moving member 23. The second moving member 22 may include a guide portion 22*b* guided along the guide groove 21*a* of the second linear actuator 21, and a projection 22*a* protruding from the guide portion 22*b*. The guide portion 22*b* may be movably received in the guide groove 21*a*. The third moving member 23 may include a guide portion 23*b* guided along the guide groove 21*a* of the second linear actuator 21, and a projection 23*a* protruding from the guide portion 23*b*. The guide portion 23*b* may be movably received in the guide groove 21*a*.

Figure 13:
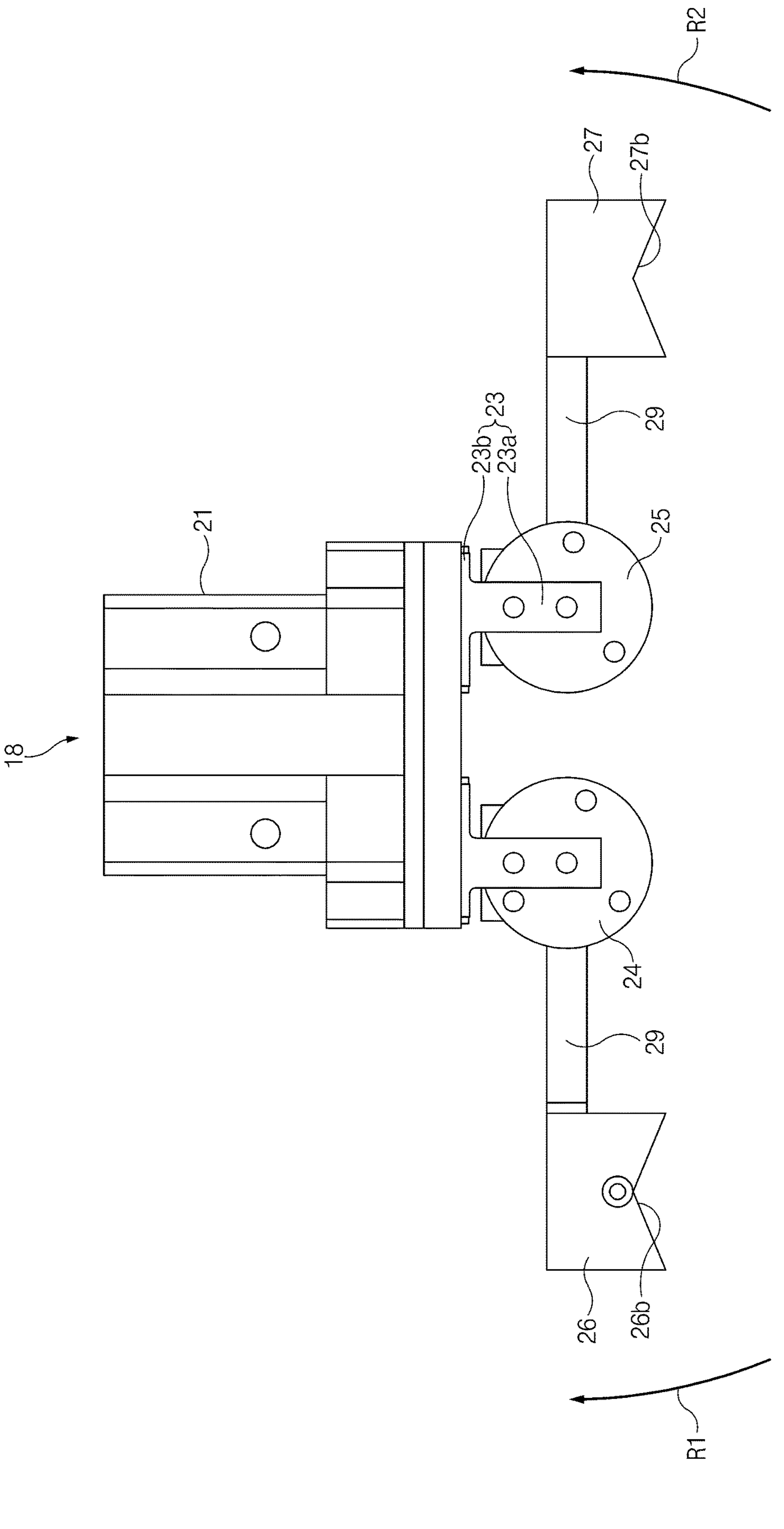
FIG. 13 illustrates a state in which a first leg and a second leg of a cable organizer illustrated in FIG. 12 are positioned straightly by a first rotary actuator and a second rotary actuator.

Referring to FIGS. 10 and 13, the cable clamp 18 may include a first rotary actuator 24 rotating the first clamp member 26 in a first rotation direction R1, and a second rotary actuator 25 rotating the second clamp member 27 in a second rotation direction R2. The first rotary actuator 24 may be mounted on the projection 22*a* of the second moving member 22, and the second rotary actuator 25 may be mounted on the projection 23*a* of the third moving member 23. The first leg 28 may be rotatably connected to the first rotary actuator 24 through a first rotation support member 24*a*, and the first rotary actuator 24 may rotate the first leg 28 around a rotation axis X1 thereof. The second leg 29 may be rotatably connected to the second rotary actuator 25 through a second rotation support member 25*a*, and the second rotary actuator 25 may rotate the second leg 29 around a rotation axis X2 thereof.

The first leg 28 and the second leg 29 may move between a straight position and a parallel position by the first rotary actuator 24 and the second rotary actuator 25. The straight position refers to a position in which the first leg 28 and the second leg 29 are aligned straightly, and the parallel position refers to a position in which the first leg 28 and the second leg 29 are parallel to each other.

Referring to FIG. 13, the first rotary actuator 24 may rotate the first leg 28 in the first rotation direction R1, and the second rotary actuator 25 may rotate the second leg 29 in the second rotation direction R2 so that the first leg 28 and the second leg 29 may be spread while moving away from each other in the opposite directions. The first leg 28 and the second leg 29 may move to the straight position perpendicular to the longitudinal axis of the second linear actuator 21, and the first leg 28 and the second leg 29 may be parallel to the guide groove 21*a* of the second linear actuator 21. In a state in which the grippers 13 grip the rear spoiler 2, when the cable clamp 18 moves downward by the first linear actuator 15, the first leg 28 and the second leg 29 may be in the straight position by the first rotary actuator 24 and the second rotary actuator 25 so that the cable clamp 18 may not interfere with the rear spoiler 2.

A height of the first clamp member 26 may be different from a height of the second clamp member 27. Accordingly, the first clamp member 26 and the second clamp member 27 may adjust a clamping area of the cable 5 so that they may properly clamp cables of various diameters. Referring to FIGS. 10 and 11, a top surface 26*a* of the first clamp member 26 may be aligned with a bottom surface 27*a* of the second clamp member 27, and accordingly the first clamp surface 26*b* of the first clamp member 26 may be located below the second clamp surface 27*b* of the second clamp member 27. Since the first clamp surface 26*b* of the first clamp member 26 is not aligned with the second clamp surface 27*b* of the second clamp member 27 in the horizontal direction (misalignment), the cable 5 may be clamped by the first clamp surface 26*b* of the first clamp member 26 and the second clamp surface 27*b* of the second clamp member 27.

Figure 14:
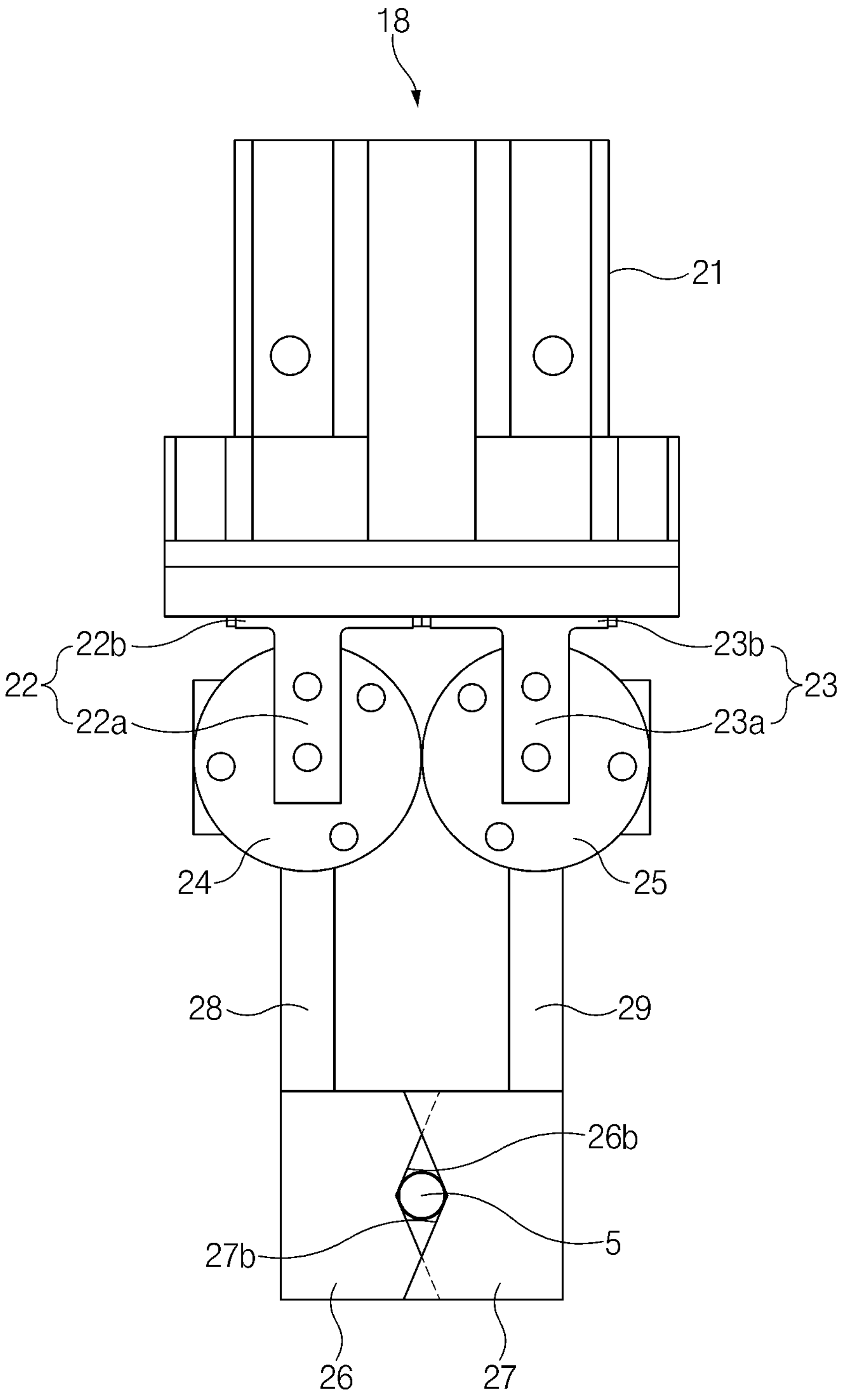
FIG. 14 illustrates a state in which a cable is clamped by a first clamp member and a second clamp member of a cable organizer in a gripper apparatus according to an exemplary embodiment of the present disclosure.

Referring to FIG. 14, when the first clamp member 26 and the second clamp member 27 move close to each other, the first clamp member 26 and the second clamp member 27 may at least partially overlap each other, and the first clamp surface 26*b* of the first clamp member 26 and the second clamp surface 27*b* of the second clamp member 27 may properly clamp the cable 5.

Figure 15:
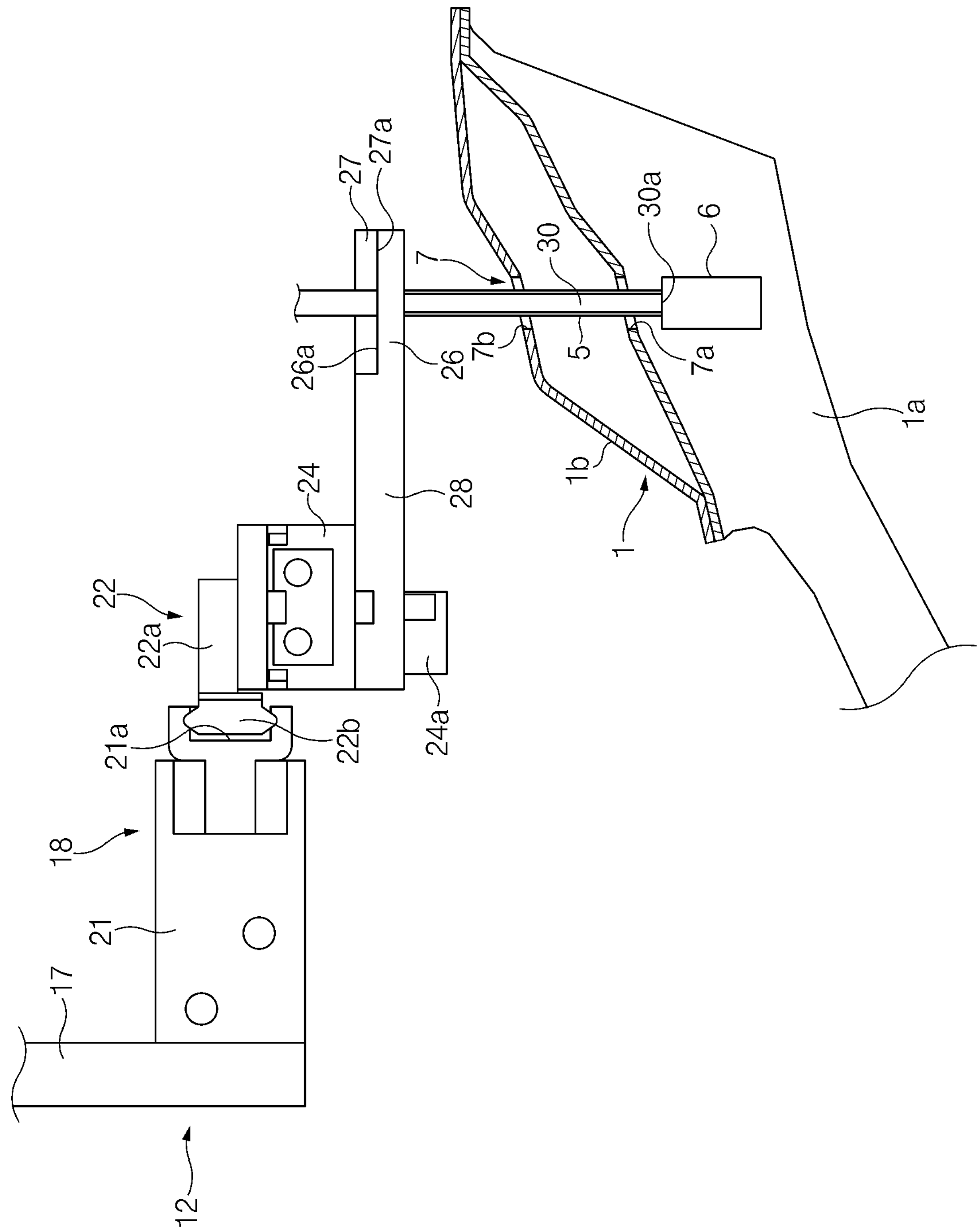
FIG. 15 illustrates a side view, viewed in a direction indicated by arrow C of FIG. 11.
Figure 16:
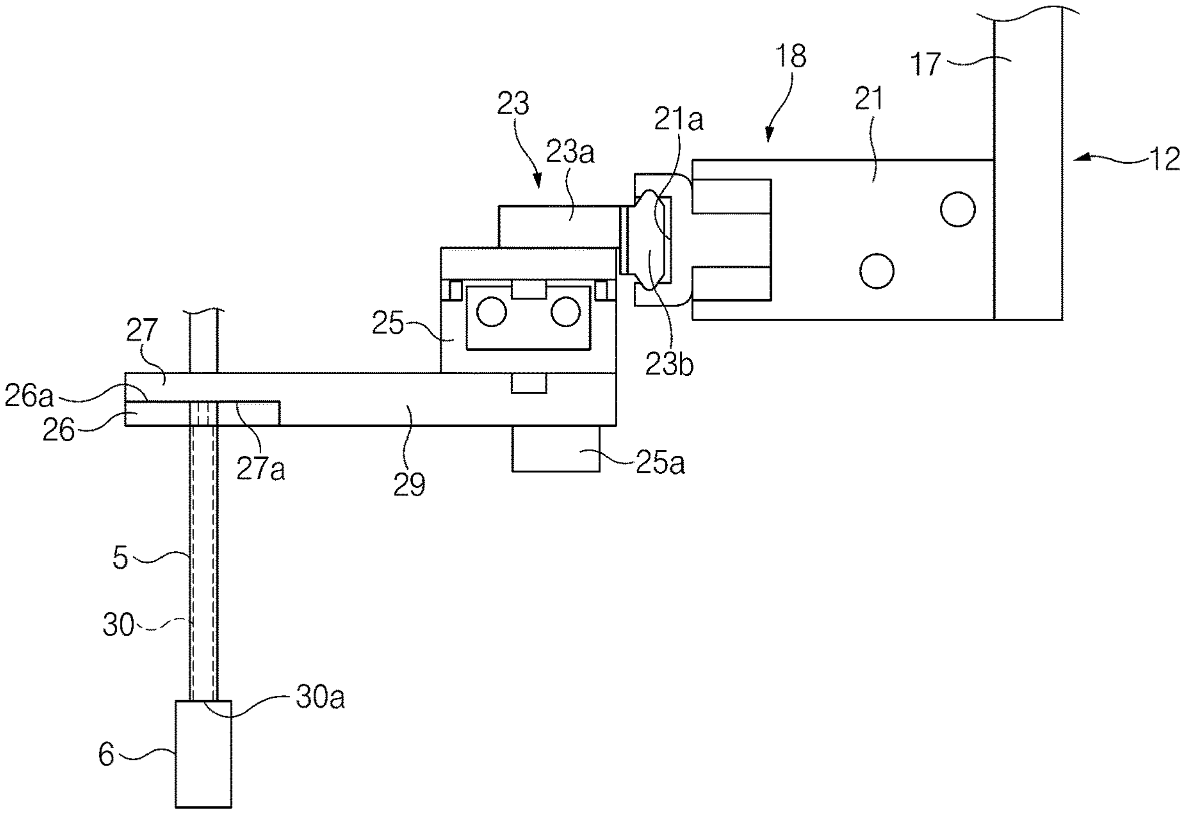
FIG. 16 illustrates a side view, viewed in a direction indicated by arrow D of FIG. 11.

Referring to FIGS. 15 and 16, in a state in which the first clamp member 26 and the second clamp member 27 clamp the cable 5, when the cable clamp 18 moves downward by the first linear actuator 15, a bottom end 30*a* of the connector push pin 30 may push the top surface of the connector 6 of the cable 5 so that the cable 5 may be organized in approximately a straight line, e.g., and accordingly the twisted portion 5*a* of the cable 5 may be removed.

Hereinbelow, a process of organizing the cable 5 in a state in which the grippers 13 of the gripper apparatus 10 grip the rear spoiler 2, which is a component to be loaded, will be described.

The grippers 13 of the gripper apparatus 10 may grip the rear spoiler 2 which is a component to be loaded. In a state in which the first clamp member 26 and the second clamp member 27 of the cable clamp 18 are spaced apart from each other by the second linear actuator 21, the first clamp member 26 and the second clamp member 27 may move to the straight position by the first rotary actuator 24 and the second rotary actuator 25 so that the cable 5 may be unclamped by the first clamp member 26 and the second clamp member 27.

In a state in which the cable 5 is unclamped by the first clamp member 26 and the second clamp member 27, as the cable clamp 18 moves downward by the first linear actuator 15, the first clamp member 26 and the second clamp member 27 may move close to the rear spoiler 2.

Thereafter, as the first clamp member 26 and the second clamp member 27 rotate in the opposite directions by the first rotary actuator 24 and the second rotary actuator 25, the first leg 28 of the first clamp member 26 and the second leg 29 of the second clamp member 27 may move to the parallel position which is parallel to the longitudinal axis of the second linear actuator 21. As the first leg 28 and the second leg 29 move close to each other by the second linear actuator 21, the first clamp member 26 and the second clamp member 27 may clamp the cable 5 relatively loosely.

In a state in which the first clamp member 26 and the second clamp member 27 clamp the cable 5, the cable clamp 18 may move downward by the first linear actuator 15 so that the bottom end 30*a* of the connector push pin 30 may push the top surface of the connector 6 of the cable 5. As the bottom end 30*a* of the connector push pin 30 pushes the top surface of the connector 6 of the cable 5 in a state in which the first clamp member 26 and the second clamp member 27 clamp the cable 5, the cable 5 may be tensioned along the longitudinal direction of the connector push pin 30, and accordingly the cable 5 may be organized so that the twisted portion of the cable 5 may be removed.

In a state in which the cable organizer 12 organizes the cable 5, the robot (not shown) connected to the mount 50 of the main body 11 may load the rear spoiler 2 onto a tailgate 1. In order that the connector 6 of the cable 5 may completely pass through a hole 7 of the tailgate 1, the cable clamp 18 may move downward by the first linear actuator 15.

Referring to FIG. 15, the tailgate 1 may include an inner panel 1*a* and an outer panel 1*b* coupled to the inner panel 1*a*. The hole 7 may include an inner hole 7*a* of the inner panel 1*a* and an outer hole 7*b* of the outer panel 1*b*, and the inner hole 7*a* of the inner panel 1*a* may be aligned with the outer hole 7*b* of the outer panel 1*b*. In particular, in a state in which the cable clamp 18 clamps the cable 5, as the cable clamp 18 moves downward by the first linear actuator 15, the cable 5 may easily pass through the outer hole 7*b* and the inner hole 7*a* of the tailgate 1.

After the cable 5 of the rear spoiler 2 completely passes through the hole 7 of the tailgate 1, the first leg 28 and the second leg 29 may move to the straight position by the second linear actuator 21, the first rotary actuator 24, and the second rotary actuator 25 so that the first clamp member 26 and the second clamp member 27 may unclamp the cable 5. As the cable clamp 18 moves upward by the first linear actuator 15, the cable clamp 18 may move above the rear spoiler 2 without interfering with the rear spoiler 2.

Then, the rear spoiler 2 may be completely loaded onto the tailgate 1 by the robot connected to the mount 50 of the main body 11, and an operator and/or the robot may complete the assembly of the rear spoiler 2 and the tailgate 1.

As described above, the gripper apparatus 10 according to exemplary embodiments of the present disclosure may automatically organize the cable 5 using the cable organizer 12 when loading the rear spoiler 2 having the cable 5 onto the tailgate 1 so that the cable 5 may easily pass through the hole 7 of the tailgate 1, and accordingly the assembly process of the rear spoiler 2 and the tailgate 1 may be very simplified, and the assembly time of the rear spoiler 2 and the tailgate 1 may be reduced.

According to exemplary embodiments of the present disclosure, when a component having a cable (e.g., a rear spoiler) is loaded onto another component (e.g., a tailgate), the cable may be automatically organized by the cable organizer so that the cable may be allowed to easily pass through the hole of another component, which makes the assembly process of these components simpler and easier, and makes the assembly time shorter.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A gripper apparatus for vehicle assembly, comprising:
- a main body;
- a gripper mounted on the main body, and configured to grip a component to be loaded; and
- a cable organizer connected to the main body, and configured to organize a cable extending from the component, wherein the cable organizer further comprises:
- a cable clamp for clamping or unclamping the cable; and
- a connector push pin extending from the cable clamp and configured to push a connector provided on an end of the cable.

2. The gripper apparatus according to claim 1, wherein the cable organizer further includes:
- a first linear actuator mounted on the main body, the first linear actuator configured to move the cable clamp upward and downward.

3. The gripper apparatus according to claim 2, wherein the cable organizer further includes a first moving member which is movable upward and downward by the first linear actuator, and wherein the cable clamp is mounted on the first moving member.

4. The gripper apparatus according to claim 3, wherein the cable clamp includes a first clamp member, a second clamp member facing the first clamp member, and a second linear actuator configured to move the first clamp member and the second clamp member in opposite directions.

5. The gripper apparatus according to claim 4, wherein each of the first clamp member and the second clamp member has a clamp surface for pressing the cable, and the clamp surface has a concave shape.

6. The gripper apparatus according to claim 4, wherein a height of the first clamp member is different from a height of the second clamp member.

7. The gripper apparatus according to claim 4, wherein the second linear actuator is fixed to the first moving member.

8. The gripper apparatus according to claim 4, wherein the cable clamp further includes a second moving member and a third moving member which are configured to move in opposite directions by the second linear actuator, and wherein the first clamp member is connected to the second moving member, and the second clamp member is connected to the third moving member.

9. The gripper apparatus according to claim 8, wherein the cable clamp further includes a first rotary actuator for rotating the first clamp member, and a second rotary actuator for rotating the second clamp member.

10. The gripper apparatus according to claim 9, wherein the first rotary actuator is mounted on the second moving member, and the second rotary actuator is mounted on the third moving member.

11. The gripper apparatus according to claim 9, wherein the first clamp member has a first leg rotatably connected to the first rotary actuator, and the second clamp member has a second leg rotatably connected to the second rotary actuator.

12. The gripper apparatus according to claim 4, wherein the connector push pin extends from at least one of the first clamp member and the second clamp member.

13. The gripper apparatus according to claim 1, wherein the gripper is mounted on an end of a rod extending from the main body.

14. The gripper apparatus according to claim 1, wherein the gripper is rotated by a gripper rotary actuator, and the gripper rotary actuator is mounted on the main body.

15. The gripper apparatus according to claim 14, wherein the gripper rotary actuator includes a rotation bracket rotatably mounted on an end of the gripper rotary actuator, and the gripper is mounted on an end of a rod extending from the rotation bracket.

16. A vehicle comprising a component assembled by the gripper apparatus of claim 1.

17. A gripper apparatus for assembling a component of a vehicle, the gripper apparatus comprising:
- a main body;
- a gripper mounted on the main body, and configured to grip the component to be loaded; and
- a cable organizer connected to the main body, and configured to organize a cable extending from the component, wherein the cable organizer further comprises:
- a cable clamp for clamping or unclamping the cable;
- a first linear actuator mounted on the main body, the first linear actuator configured to move the cable clamp upward and downward; and
- a connector push pin extending from the cable clamp and configured to push a connector provided on an end of the cable.

18. The gripper apparatus according to claim 17, wherein the cable organizer further includes a first moving member which is movable upward and downward by the first linear actuator, and wherein the cable clamp is mounted on the first moving member.

19. The gripper apparatus according to claim 18, wherein the cable clamp includes a first clamp member, a second clamp member facing the first clamp member, and a second linear actuator configured to move the first clamp member and the second clamp member in opposite directions.

20. The gripper apparatus according to claim 19, wherein each of the first clamp member and the second clamp member has a clamp surface for pressing the cable, and the clamp surface has a concave shape.

* * * * *